Patented Apr. 10, 1934

1,954,463

UNITED STATES PATENT OFFICE 1,954,463

REFINING WHITE METAL SCRAP

Gustave W. Thompson, Sayville, and Edmund H. Sheaff, Brooklyn, N. Y., assignors to National Lead Company, New York, N. Y., a corporation of New Jersey No Drawing. Application July 19, 1930, Serial No. 469,252. Renewed August 3, 1933

2 Claims. (Cl. 75—17)

The invention is a process of refining "white metal" alloys such as tin- or lead-base alloys, for the purpose of eliminating therefrom, or reducing therein, the proportions of certain ingredient metals regarded as undesirable or as impurities and commonly such as antimony, copper, arsenic and iron, but including any others to which the process applies. Its object is to accomplish such removal, or reduction of proportions, with the least expense and with the use of simple apparatus and so that the values as may exist in the materials removed may be also easily recovered.

The process comprises first ascertaining, by test or otherwise, the existing proportions of such impurity metal or metals in the metal to be treated and then adding and mixing into the latter, while in a molten state, an appropriate amount of aluminum, as later explained. The aluminum is commonly added in the form of flat or substantially flat pieces, such as the cuttings from aluminum sheets, which are readily spread over the molten metal and float thereon, forming a protective blanket on the metal, more or less excluding air and thus preventing burning during the raising of the metal to the temperature at which the aluminum will combine therewith. Whether introduced in this form, or otherwise, the aluminum is actively stirred into the metal, when the latter has reached the proper temperature, say 600° C. or 620° C. The solid pieces dissolve in the liquid metal before the melting point of the aluminum addition has been reached and the stirring is continued until they have disappeared. The reaction is exothermic and results in the formation of chemical compounds of aluminum with the impurity metal or metals, which have a composition corresponding to the general formulas, $AlSb$, $AlCu_2$, etc. according as to which of the impurity metals were present in the original metal. So-called white metal scrap commonly contains a predominating portion of antimony which is thus, in most cases, the principal impurity to be removed.

Instead of adding the aluminum alone, an alloy of aluminum with another metal can be used in those cases where the introduction of the companion metal is not incompatible with the process or the result desired. That is to say, if the metal under treatment already contains tin, the process may be performed by adding a tin-aluminum alloy, for example, one-third aluminum and two-thirds tin, in place of straight aluminum, because the tin thus introduced would merely be in addition to that already present and may not be inconsistent with the result aimed at.

The amount of aluminum added, whether as straight aluminum or alloy, depends on the amount of impurities to be removed, and for complete removal of the ordinary run of the impurities mentioned is from two to three-ninths of the amount of such impurities by weight more or less, or slightly more than the theoretical combining power of aluminum with the particular impurity metal or metals, thus avoiding any substantial excess of aluminum after the reaction is complete. If the proportion of impurity metal or metals is merely to be reduced, as distinguished from complete elimination, the amount of aluminum addition is less and is regulated accordingly, the rule being that the added aluminum should not greatly exceed the combining power and where the impurity is principally antimony that the aluminum should be added in proportion to reduce it only to within .1% or .2% of the amount desired.

Following the aluminum reaction, the metal is cooled to a point below that at which the aluminum compounds referred to are soluble therein, namely, around 300° C., being variable according to the tin content, if any, in the alloy and being lower as such tin content is larger, the practical rule being to cool to within about 100° C. of the freezing point of the metal, which causes the products of the reaction between the aluminum and the mentioned impurity metal or metals to separate sharply, in the form of a thick mush, floating on the metal, somewhat similar to the zinc crust of the Parkes process of de-silverizing lead. This mush holds all the compounds of aluminum with the impurity metal or metals as stated, and if aluminum has been added for complete elimination and properly stirred in, will be found to have cleared the original metal of such impurities down to a fraction of a per cent. or a trace.

The separation of the metal and mush, which is the next step, can be accomplished by skimming and draining, the skimmings being cast in ingots and later sweated to recover therefrom the portion of the original or "mother liquor" metal which adhered to the mush crystals or particles, but this method is expensive in that it requires successive meltings and sweatings to secure a profitable recovery. We have found that the character of the mush formed by the aluminum reaction with antimony, copper, arsenic or iron is such that it can be more efficiently separated from the liquid metal in a hot filter so constructed that the mush crystals are retained therein where they may be easily dried of most of the melting metal, this being done in a single operation and with no necessary delay as incident to the casting and sweating procedure. According to this invention therefore, the entire content of the kettle, with the mush still in it is passed through a filter, which latter may consist of any suitable container having a foraminous bottom, preferably removable, and having a charging entrance which can be closed so that fluid pressure, such as air pressure, can be used to force the metal through. The mush crystals compact against the perforated filter bottom and form the real filter medium. If not separated in this way the mush, otherwise removed, is placed in the filter; it may be poured into it or deposited therein in the form of pigs and remelted in the filter. In either case the mass of separated mush becomes located in the filter and by then introducing compressed air, into the top of the filter, the wetting metal can be blasted off and driven out through the holes in the filter bottom, then to be restored to the main body of metal of which it was originally a part. After such air blast treatment, the bottom of the filter is removed or opened and the filter cake of dried mush ejected, by the application of further air pressure if necessary. If desired, before the final drying of the cake with air some wood can be placed in the filter. The wood will further the release of the tin and/or lead from the mush in the filter and result in a concentration of aluminum in the mush compounds about 10% greater than if no wood were used.

In cases where the metal under treatment is high in a more valuable metal such as tin and consequently the metal which wets the mush is similarly high in that metal, practically all of the latter can be removed from the mush while in the filter, by forcing a different metal such as molten lead or molten lead alloy through it, thus washing out the tin and leaving lead in its place as the wetting metal. The molten lead can be forced through the mush by its gravity or by air pressure and that remaining portion which then wets the mush can similarly be blasted out, fairly completely, by the further use of the air pressure as already described. In this way all of the tin value in mush can be recovered, practically none of it being left in the residual mush filter cake. In both cases the original wetting metal is forcibly removed by the use of another fluid medium in the one case, air, and in the other a different metal, and while the mush remains in the filter. In the use of the filter its discharging end is desirably protected, while at work, so that the issuing fine jets of metal are protected against oxidation. This can be done by suspending the filter over the kettle with its perforated or lower end close to the bottom and therefore submerged in the molten metal. The filter jets thus issue directly into the molten metal.

The small portion of aluminum, remaining in the metal after filtering or separation from the mush, is eliminated by introducing or mixing with the still liquid metal, a proper portion of some material capable of selective reaction with aluminum in preference to the tin or lead or metals desired to remain in the product and adapted to produce a dross thereof which can be removed. Sulfur can be used for this purpose and also other materials. It may be accomplished by simply stirring the metal while exposed to air or by mixing a combustible material into it, such as crushed anthracite or bituminous coal, stirring it into the metal when it has been raised to between 760° and 840°. The coal is allowed to burn and removes aluminum to a trace and with little loss of the metal being treated, besides being very easily applied.

The values in the skimmings or the filter cake material are recoverable by ordinary processes of smelting in a blast furnace and such material also lends itself to specially satisfactory smelting in a reverberatory furnace in contact with oxides of metals such for example as the metals (other than aluminum) which the filter cake material holds in chemical combination; this reaction results in the production of oxides of aluminum as dross or slag and a metal or alloy which is available for use according to its composition.

We claim:

1. In the process of removing antimony, copper, arsenic or iron from lead- and tin-base alloys, which process consists in stirring aluminum into the molten alloy to produce a mush compound of aluminum with the metal to be removed and then cooling the melt to a temperature at which said compound is substantially insoluble in the liquid metal; the step of separating the compound from the liquid which comprises passing the melt under a suitable pressure, and while at said temperature, through a filter wherein the accumulating compacted cake of solid mush particles constitutes the filtering medium.

2. In the process of removing antimony, copper, arsenic or iron from lead- and tin-base alloys, which process consists in stirring aluminum into the molten alloy to produce a mush compound of aluminum with the metal to be removed and then cooling the melt to a temperature at which said compound is substantially insoluble in the liquid metal; the steps which comprise passing the melt under fluid pressure applied thereto and while remaining at such temperature, through a filter wherein the accumulating cake of mush particles constitutes the filtering medium and continuing the application of the fluid pressure until after the body of liquid metal has passed out of the filter thereby blasting off the molten wetting metal which adheres to the mush particles.

GUSTAVE W. THOMPSON.
EDMUND H. SHEAFF.